(12) United States Patent
Grosse

(10) Patent No.: US 10,384,729 B2
(45) Date of Patent: Aug. 20, 2019

(54) DRAG REDUCTION SYSTEM

(71) Applicant: Trailer Pro Technology, Inc., Scottsdale, AZ (US)

(72) Inventor: John Kendall Grosse, Gilbert, AZ (US)

(73) Assignee: TrailerPro Technology, Inc., Scottsdale, AZ (US)

( * ) Notice: Subject to any disclaimer, the term of this patent is extended or adjusted under 35 U.S.C. 154(b) by 0 days.

(21) Appl. No.: 15/574,438

(22) PCT Filed: May 18, 2016

(86) PCT No.: PCT/US2016/033079
§ 371 (c)(1),
(2) Date: Nov. 15, 2017

(87) PCT Pub. No.: WO2016/187301
PCT Pub. Date: Nov. 24, 2016

(65) Prior Publication Data
US 2018/0290694 A1    Oct. 11, 2018

Related U.S. Application Data

(60) Provisional application No. 62/163,337, filed on May 18, 2015.

(51) Int. Cl.
*B62D 35/00* (2006.01)
*B62D 37/02* (2006.01)
*F15D 1/12* (2006.01)

(52) U.S. Cl.
CPC ......... *B62D 35/001* (2013.01); *B62D 35/007* (2013.01); *B62D 37/02* (2013.01); *F15D 1/12* (2013.01)

(58) Field of Classification Search
CPC .. B62D 35/001; B62D 35/007; B62D 35/008; B62D 37/02
USPC .......................................... 296/180.2, 180.4
See application file for complete search history.

(56) References Cited

U.S. PATENT DOCUMENTS

| | | | |
|---|---|---|---|
| 4,320,920 A * | 3/1982 | Goudey | B62D 35/001 296/180.4 |
| 4,357,045 A | 11/1982 | Kingford | |
| 8,196,994 B2 * | 6/2012 | Chen | B62D 35/001 180/903 |
| 8,196,995 B2 * | 6/2012 | Chen | B62D 35/001 180/903 |
| 8,608,228 B2 | 12/2013 | Visentin | |
| 8,845,007 B2 * | 9/2014 | Ryan | B62D 35/001 296/180.1 |
| 2007/0013209 A1 | 1/2007 | Neuburger et al. | |
| 2007/0200390 A1 | 8/2007 | Lotarev et al. | |
| 2011/0042998 A1 | 2/2011 | Rinehart et al. | |

(Continued)

FOREIGN PATENT DOCUMENTS

CA    2638118 A1    1/2009

*Primary Examiner* — Jason S Daniels
(74) *Attorney, Agent, or Firm* — Burgess Law Office, PLLC

(57) ABSTRACT

A drag reduction system for use with a vehicle movable between a first, operative position and a second, inoperative position. The system including at least one deflector or nozzle and an actuator attached to the deflector, said actuator acting on and moving the deflector between the first and second position.

18 Claims, 10 Drawing Sheets

(56) References Cited

U.S. PATENT DOCUMENTS

2011/0095564 A1* 4/2011 Chen .................... B62D 35/001
                                                    296/180.4
2013/0057020 A1* 3/2013 Burrell ................. B62D 35/001
                                                    296/180.2

* cited by examiner

DRAG REDUCTION SYSTEM

CROSS-REFERENCE TO RELATED APPLICATIONS

This application is a National Stage of International Application No. PCT/US2016/033079, filed May 18, 2016, which claims the benefit of U.S. Provisional Application No. 62/163,337, filed May 18, 2105.

BACKGROUND OF THE INVENTION

1. Field of the Invention

The present invention relates generally to a device for reducing airflow resistance and drag on vehicles; and more particularly, to a retractable rear vehicle/trailer drag reduction system.

2. Description of Related Art

A vehicle moving forward, such as a tractor and semi-trailer creates low-pressure region behind the semi-trailer. This low-pressure region results in a drag or rearward pull on the vehicle. The vehicle engine consumes additional fuel to overcome drag or rearward pull. Reducing drag increases fuel savings and correspondingly reduces operation costs. Solutions to reducing the drag or rearward pull include drag reduction structures or devices attached to the vehicle that alter or redirect the airflow at the rear of the vehicle; for example a boat tail structure, skirts, deflector shields, nozzles and airfoils.

Such structures or devices attached to the rear of the semi-trailer may interfere with fully opening the vehicle doors. They may cause additional work for the vehicle operator before opening the vehicle doors prior to the loading/unloading process. For example, the vehicle operator may be required to unlatch or release, and move the drag reduction structure prior to opening the vehicle doors.

SUMMARY OF THE INVENTION

One example of the present invention includes a drag reduction system for a vehicle. The system includes a deflector movable between a first, operative position and a second, inoperative position. An actuator is connected to the deflector, wherein the actuator controls movement of the deflector between the first, operative position and the second, inoperative position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
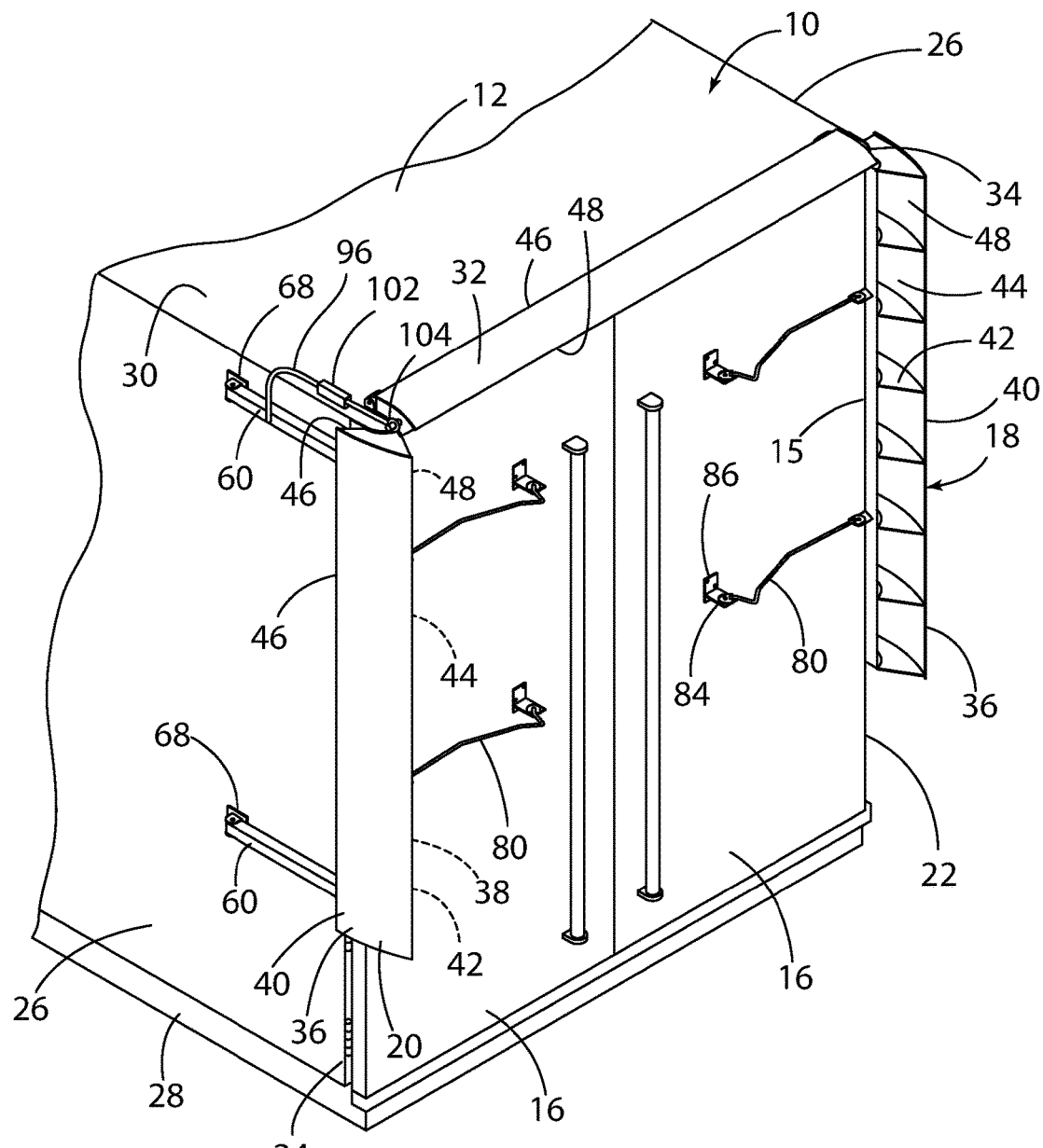
FIG. 1 is a perspective view of an exemplary embodiment of the drag reduction system according to the present invention attached to a semi-trailer.
Figure 2:
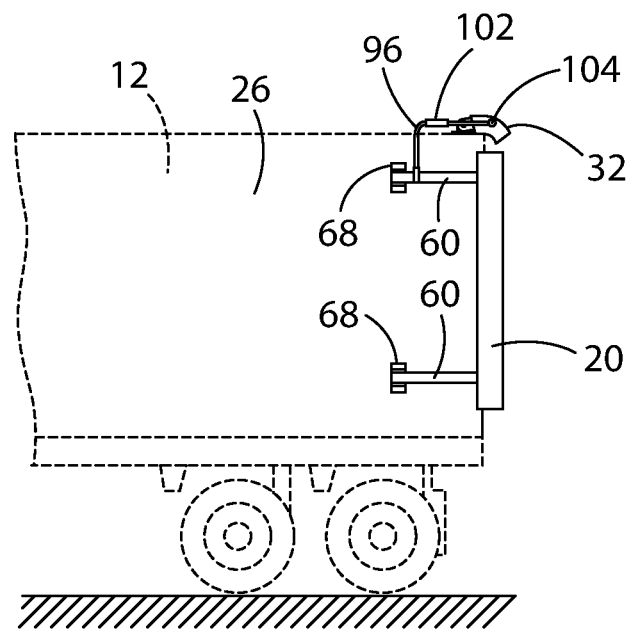
FIG. 2 is a partially schematic side view of the drag reduction system of FIG. 1 in a closed or first, engaged, operative position.
Figure 3:
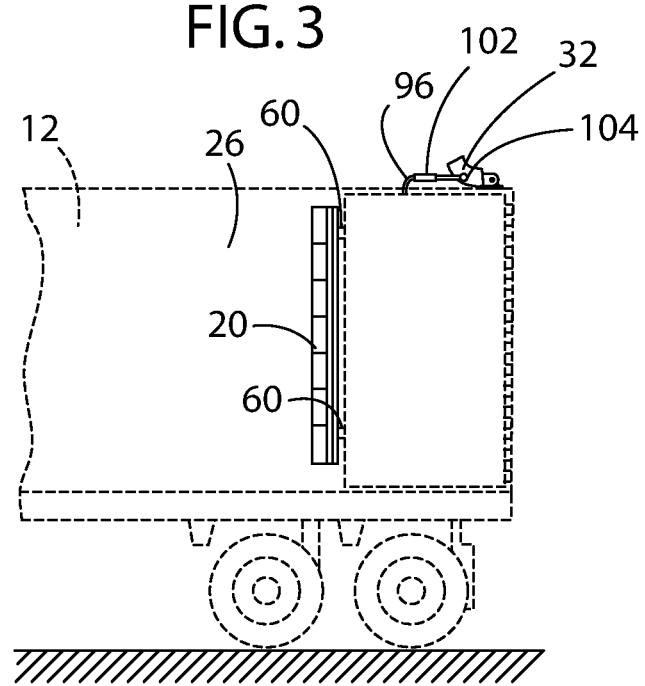
FIG. 3 is a partial, schematic side view of the drag reduction system of FIG. 2 in an open or second, disengaged position.
Figure 4:
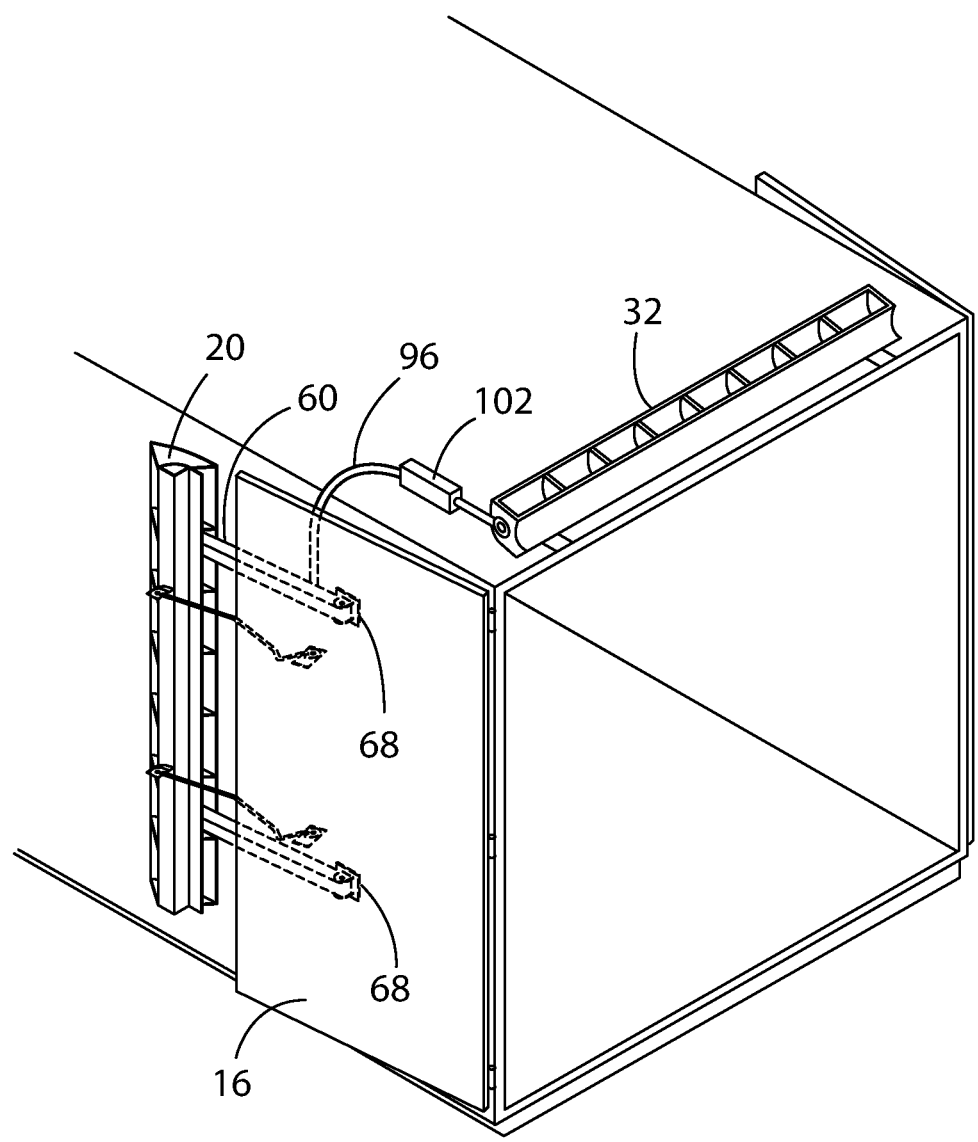
FIG. 4 is a partial, schematic perspective view of the drag reduction system of FIG. 1 in an open or second, disengaged position.
Figure 5:
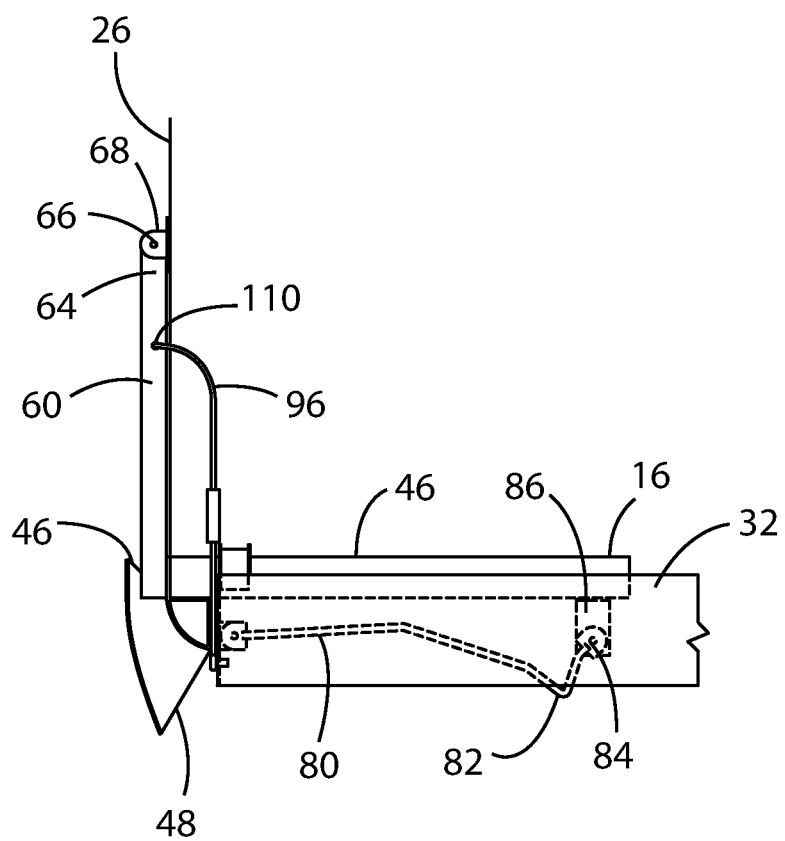
FIG. 5 is a partial, schematic top view of the drag reduction system of FIG. 1 illustrating a rear door of the vehicle fully closed and the drag reduction system in a closed or first, engaged operative position.
Figure 6:
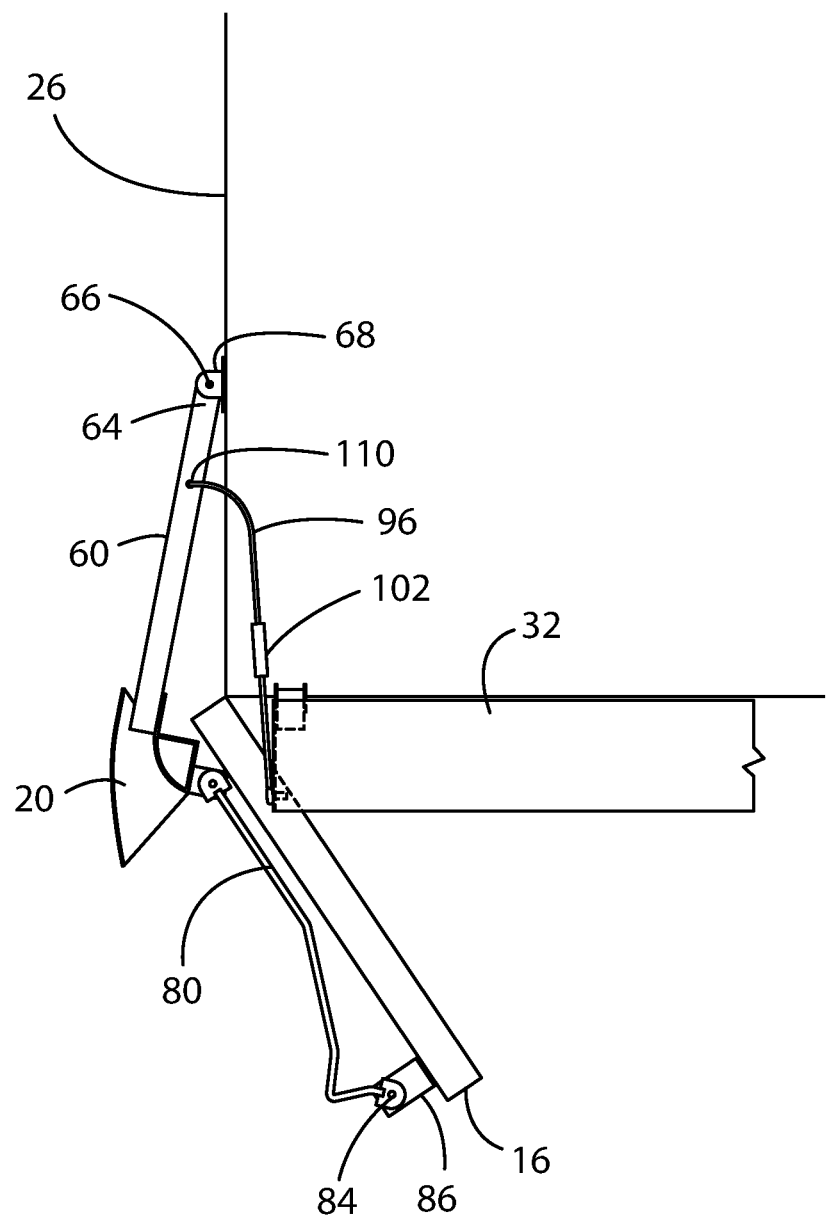
FIG. 6 is a partial, schematic top view of the drag reduction system of FIG. 1 illustrating the rear door of the vehicle partially open and the drag reduction system initially moving outward.

The following description of the preferred embodiment(s) is merely exemplary in nature and is in no way intended to limit the invention, its application, or uses.

To promote an understanding of these principles in accordance with the disclosure, reference will now be made to the embodiments illustrated in the drawings and specific language will describe the same. It will be understood that no limitation of the disclosure is intended. Any alterations and further modifications of the inventive features illustrated, and any additional applications of the principles of the disclosure as illustrated, which would normally occur to one skilled in the art having possession of this disclosure, are to be considered within the scope of the disclosure claimed.

FIG. 1 illustrates a drag reduction system, seen generally at 10, according to an embodiment of the present invention shown mounted on a vehicle, shown as a semi-trailer 12. As illustrated, the drag reduction system 10 is mounted adjacent the rear-end 14 of the semi-trailer 12 and redirects airflow into a low-pressure zone behind the semi-trailer 12. As illustrated, the semi-trailer 12 is of a type having two outwardly opening rear doors 16.

As shown, the first and second side deflectors 18, 20 are located adjacent respective rear corners 22, 24 formed at the junction of the rear doors 16 and the semi-trailer 12 sides or sidewalls 26. The first and second side deflectors 18, 20 extend from the base or bottom 28 of the side 26 to the top or top wall 30 extending between opposite sides 26.

FIG. 1 illustrates one example wherein the side deflectors 18, 20 extend only a portion or part of the distance from the top or top side 30 of the trailer 12. The deflectors 18, 20 extend downwardly approximately 50% to 75% of the distance from the top 30 toward the bottom 28 along the sidewall 26 of the trailer 12. Doing so takes advantage of the laminar airflow along the sidewall 26 of the trailer 12 adjacent the top or top side 30 of the trailer 12 and spaces the deflectors 18, 20 from the turbulent airflow occurring adjacent the bottom area of the trailer 12, including the area around the undercarriage and wheel wells.

In an alternative example, the deflectors 18, 20 extend between the top 30 and the bottom 28 of the trailer 12. In this example, a skirt at the bottom 28 of the trailer 12 reduces turbulent airflow occurring adjacent the bottom area of the trailer 12.

A top deflector 32 is located adjacent the top corner 34 formed at the junction of the rear door 16 and the top or top wall 30 of the semi-trailer 12.

As used the term deflector is broadly construed as an air-guiding member or device that redirects, changes, or streamlines airflow. The air guiding member or device may comprise a plate, airfoil, vane, nozzle—having various configurations or shapes, or other member that causes air to move or change direction.

In the disclosed example, the side deflectors 18, 20 and top deflector 32 are formed as a nozzle 36. The nozzle 36 including a nozzle spine or inner panel 38 and an outer panel 40 interconnected by a plurality of vanes 42. The inner panel 38 and outer panel 40 each have an arcuate configuration or contour and the vanes 42 are solid, non-perforated members that follow the internal contour of the inner panel 38 and outer panel 40 panels. As illustrated, in FIGS. 9 and 10 the inner panel 38, outer panel 40, and vanes 42 cooperate to form a passageway or flow channel 44 having an inlet 46 and an outlet 48.

The configuration or contour of the respective inner panel 38 and outer panel 40 are varied such that when combined to form the passageway or flow channel 44 the area or size of the passageway or flow channel 44 at the inlet 46 is less than the area or size of passageway or flow channel 44 at the outlet 48. Although the foregoing embodiment illustrates a nozzle-style deflector, the drag reduction system 10 is suitable for use with multiple types and styles of deflectors.

Figure 9:
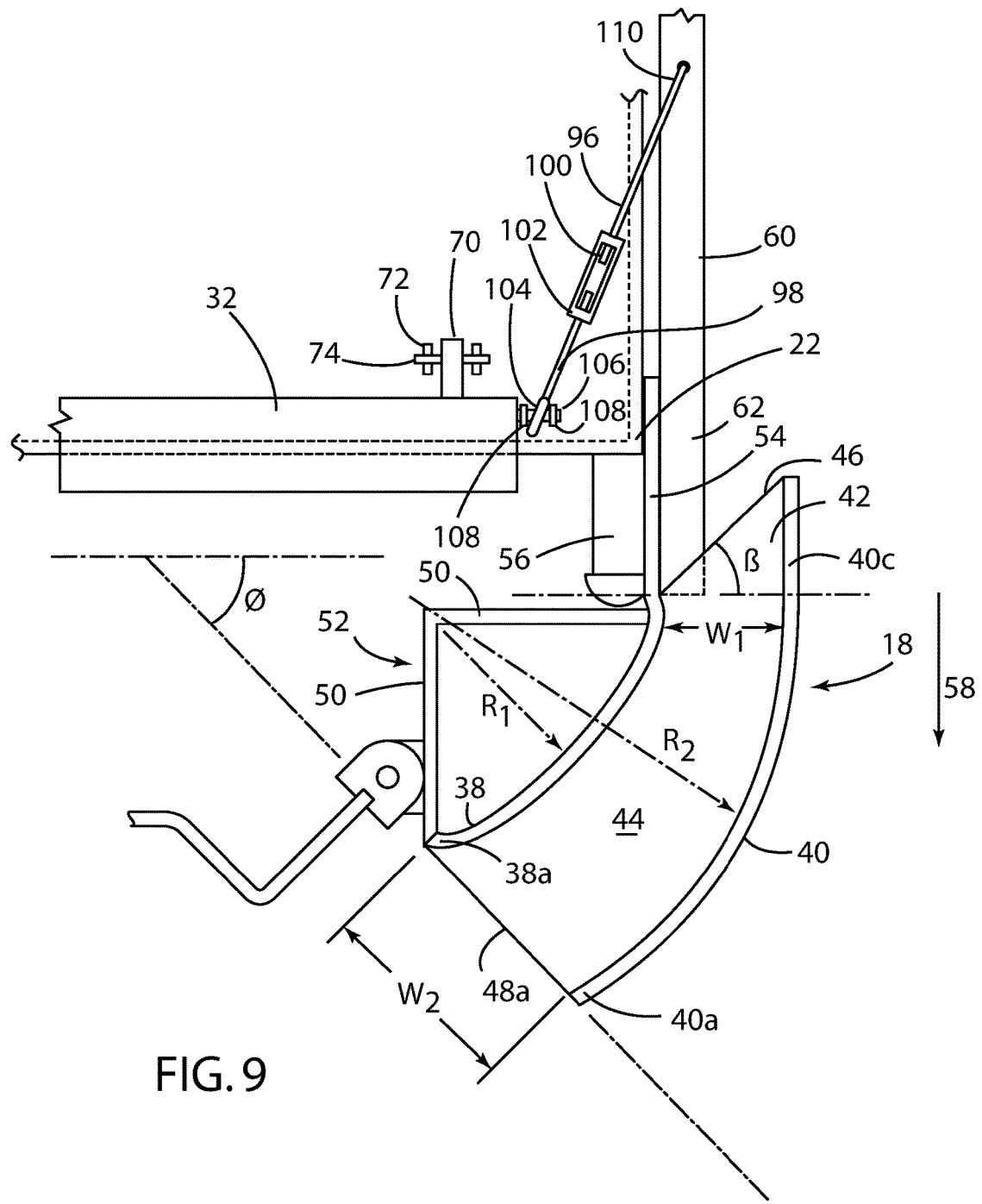
FIG. 9 is a partial, schematic top view of the drag reduction system of FIG. 1 illustrating a deflector in a closed or first, engaged, operative position.
Figure 10:
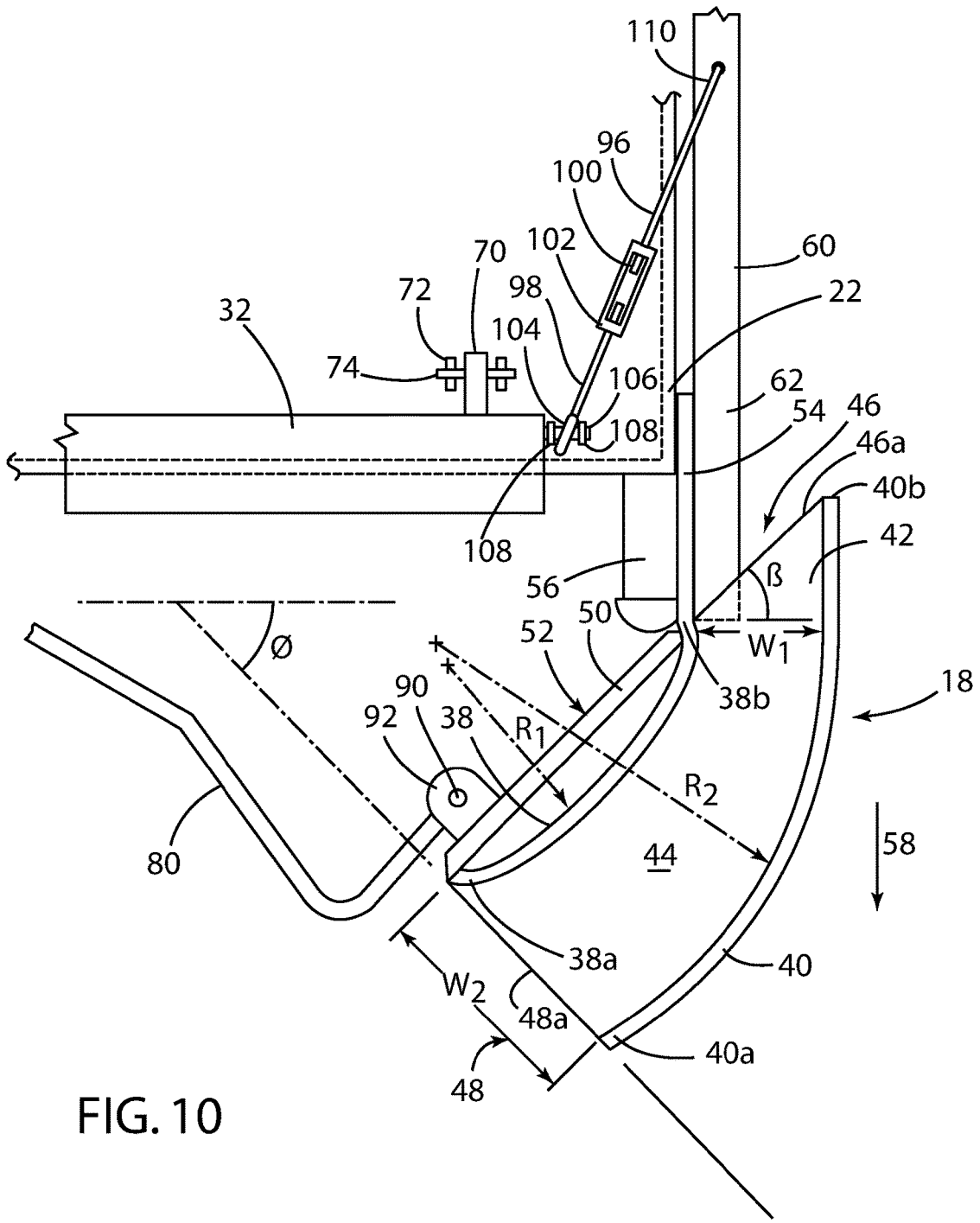
FIG. 10 is a partial, schematic top view a second embodiment of a nozzle spine configuration of the drag reduction system of FIG. 1.

FIGS. 9-10 illustrate examples of a nozzle configuration according to the present invention. The outlet end 48 having a substantially planar opening 48a extending between the respective outlet ends 38a, 40a, of the inner panel 38 and outer panel 40. The inlet end 46 having a substantially planar opening 46a extending between the respective inlet ends 38b, 40b, of the inner panel 38 and outer panel 40.

As illustrated, the outlet 48 of the passageway 44 is larger in area than the inlet 46 of the passageway 44; specifically, the substantially planar opening 48a of the outlet 48 is greater than the substantially planar opening 46a of the inlet 46. As illustrated, the linear distance between the outlet ends 38a, 40a is greater than the linear distance between the inlet ends 38b, 40b. Generally, the outlet 48 area to inlet 46 area should have a ratio range greater than 2. In the disclosed example, the ratio is approximately 2.5.

The angle θ or orientation of the substantially planar opening 48a of the outlet 48 to a line parallel to the rear end 14 of the trailer 12 and perpendicular to the direction of airflow along the trailer sidewall 26, illustrated by the arrow 58, is between 45° and 70°. In the disclosed example, the angle θ of the substantially planar opening 48a is 60°. An angle of 60° provides a desirable balance between the additional drag created by the deflector 18 and the reduction in trailer drag or rearward pull obtained by the deflector 18 redirecting airflow to the rear of the vehicle.

Both the inner panel 38 and the outer panel 40 are arcuate. In the present example, the inner panel 38 has a radius of curvature R1 and the outer panel 40 has a radius of curvature R2 with the radius of curvature R2 of the outer panel 40 being greater than the radius of curvature R1 of the inner panel 38. It should be understood that the radius of curvature R2 of the outer panel 40 primarily depends on the angle θ of the substantially planar opening 48a of the outlet 48 and the width W2 of the substantially planar opening 48a determined by the ratio. For example, given a width W1 of the substantially planar opening 46a of the inlet 46 and a ratio of 2.5 then the width W2 of the substantially planar opening 48a is 2.5 W1. Knowing the position of the end 38b of the inner panel 38, based on a predetermined radius of curvature R1 of the inner panel, the position of the outlet end 40b of the outer panel 40 can be determined based on the angle θ and width W2. Once the position of the end 40b of the outer panel 40 is determined, the radius of curvature R2 is that radius for a curve extending through the inlet end 40a of the outer panel 40 and the outlet end 40b of the outer panel 40, wherein the radius R2 defines the shape or curvature of the outer panel 40.

The nozzle 36 may include the inlet 46 having a substantially planar opening 46a oriented at an angle to the direction of the airflow entering the passageway. For example, as illustrated in FIG. 10 the outer panel 40 may include an additional wall portion or section 40c extending substantially parallel to the gap seal 54 and correspondingly the trailer sidewall 26 in a direction towards the front of the vehicle. Extending the outer panel 40 in this manner provides for an inlet having a substantially planar opening oriented at an angle β of approximately 45°. Doing so provides a scoop to assist in redirecting airflow into the nozzle 36.

The inner panel 38 of the nozzle 36 combines with a plate 50 to form a nozzle spine 52, see FIGS. 9-10. The nozzle spine 52 may be extruded as a one-piece beam member or may be fashioned from two pieces joined together. Other beam configurations are contemplated, as shown in FIG. 9, the plate 50 may be an angled member, i.e., two plates meeting together at 90°, with the ends of the angled member placed adjacent and connected to the inner panel 38. As shown in FIG. 10, the nozzle spine 52 may be hollow cross-section beam member having an arcuate sector shape. As illustrated, the arcuate sector shape has one boundary having an arcuate configuration and a second boundary being a straight line or chord. The configuration of the nozzle spine 52, specifically the configuration of the rear or support plates 50, varying as needed based on material and strength characteristics necessary to support and maintain the nozzle 36 configuration.

FIG. 9 shows the semi-trailer 12 having rear door mounting hardware, door hinge 56, at the rear corner 22 of the semi-trailer 12. The hinge 56 typically extends outwardly from the rear corner 22 of the semi-trailer 12. Depending upon the style and configuration of the hinge 56, it may form an obstruction making it difficult to place the nozzle 36 adjacent the rear corner 22 of the semi-trailer 12 creating a gap between the inner panel 38 and the rear corner 22 of the semi-trailer 12. Air traveling along the side 26 of the semi-trailer 12 flows into the gap creating a disruption or turbulent airflow at the rear corner 22 of the semi-trailer 12. The nozzle 36 further includes a seal member or gap seal 54 extending from the nozzle spine 52 to and in some cases past the rear corner 22 of the semi-trailer 12. The gap seal 54 may be formed as an integral part of the nozzle spine 52; for example, be extruded with the nozzle spine 52. In some instances, the gap seal 54 may include other seal members or elements such as rubber or foam members that contact the side 26 of the semi-trailer 12.

In the present example, the gap seal 54 extends vertically and parallel to side/top rear of trailer. The gap seal 54 may be an integral and/or single piece structure, for example part of the inner deflector nozzle spine. The gap seal 54 may be a vertically angled, non-curved or curved gap seal 54, welded or extruded/molded (depending on deflector nozzle material), that creates an aerodynamic airflow seal and closes any gap created by the trailer rear door hinges when mounting the deflectors 18, 20. The vertical side gap seal 54 may also include a mounting location for support arms 60 mounted to trailer sidewall 26.

The deflectors 18, 20 are pivotally mounted on the trailer sidewall 26 for movement between a first, operative position wherein the nozzle is adjacent the rear end 14 of the trailer 12 and redirects airflow along the trailer sidewall 26 toward the rear end 14 and a second, inoperative position wherein the deflector is located adjacent the trailer sidewall 26 when the rear door 16 is opened. As set forth below, mounting the deflectors 18, 20 in this manner enables a rear door automatic retraction and deployment mechanism.

Figure 8:
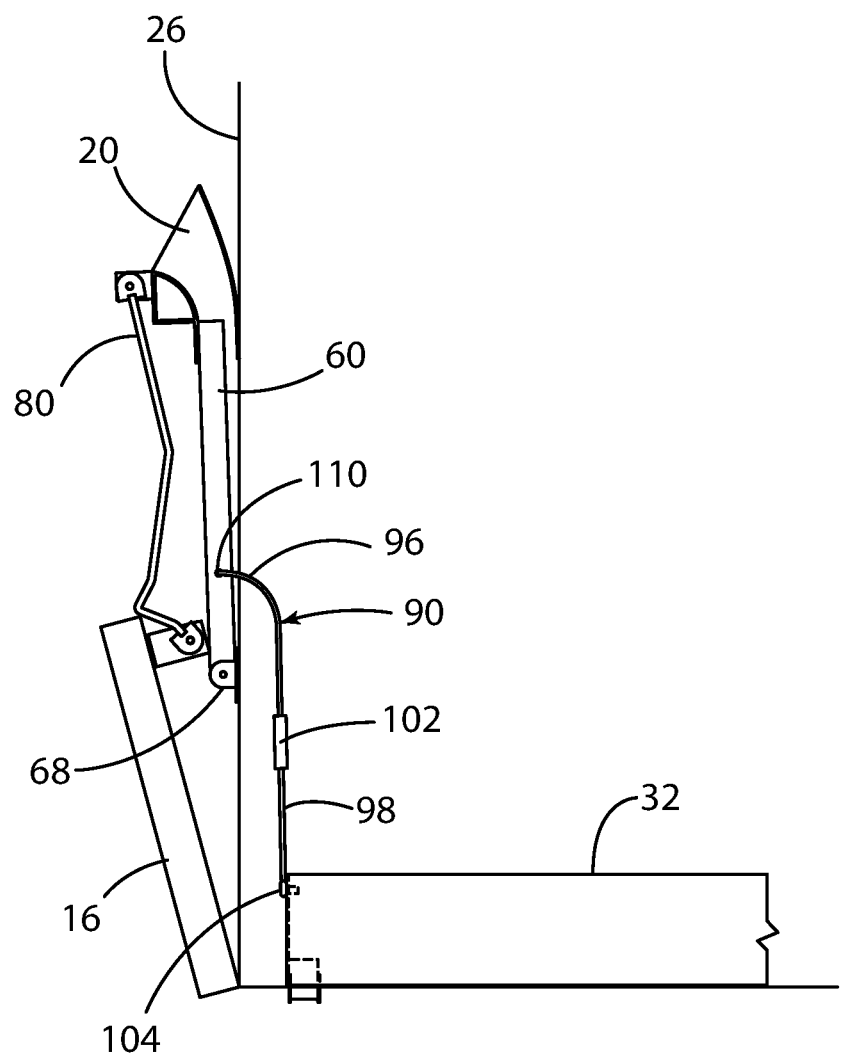
FIG. 8 is a partial, schematic top view of the drag reduction system of FIG. 1 illustrating the rear door of the vehicle 270° open and placed adjacent the side of the semi-trailer and the drag reduction system also positioned adjacent the side of the semi-trailer.

As illustrated, both first and second side deflectors 18, 20 are pivotally mounted on the side 26 of the semi-trailer 12 using a pair of support arms 60. Referring to the second side deflector 20 for illustration, the support arms 60 are connected on a first end 62 to the second side deflector 20. The second end 64 of the support arm 60 pivotally connected through the pin 66 to a bracket 68 secured to the side 26 of the semi-trailer 12. The support arms 60 support the deflector 20 in a first, engaged or operative position wherein the deflector redirects airflow toward the rear of the semi-trailer 12 and a second, disengaged position wherein it pivots or swings through a 180° arc and is positioned alongside or next to the side 26 of the semi-trailer 12, see FIG. 8. The support arm 60 or side mount bar may be secured to deflector by bolting, welding, or other methods depending on deflector materials used in manufacturing.

The nozzle 36 forming the top deflector 32 is also pivotally attached to the top 30 of the semi-trailer 12 using arms 70 pivotally connected to a bracket 72 using a pivot pin 74, see FIG. 9. As illustrated the nozzle 36 forming the top deflector 32 pivots or rotates between a first, engaged or operative position wherein the top deflector 32 redirects airflow toward the rear of the semi-trailer 12 and a second, disengaged position wherein pivots or swings upward, away from the rear doors 16. In the first, engaged operative position, the nozzle 36 forming the top deflector 32 is positioned such that the outlet 48 extends downwardly past the top corner or edge 34 of the semi-trailer 12 and interferes with opening the rear doors 16. Prior to opening the rear doors 16, the top deflector 32 is moved to the second, disengaged position providing clearance to open the rear doors 16. The nozzle 36 forming the top deflector 32 may include a gap seal. The gap seal connected to the inner panel 38 of the nozzle 36 and positioned adjacent the top or roof 30 of the semi-trailer 12. The gap seal may comprise a flexible or deformable member such as a rubber flap remains in contact with the top or roof 30 and bends or deflects as the nozzle 36 pivots between the first and second positions.

During loading and unloading of the semi-trailer 12, the rear doors 16 rotate through a 270° arc and are secured next to the side 26 of the semi-trailer 12. The nozzles 36 forming the first and second side deflectors 18, 20 must also be moved from their respective first, engaged positions to their second, disengaged positions enabling the rear doors 16 to be repositioned and secured.

Figure 7:
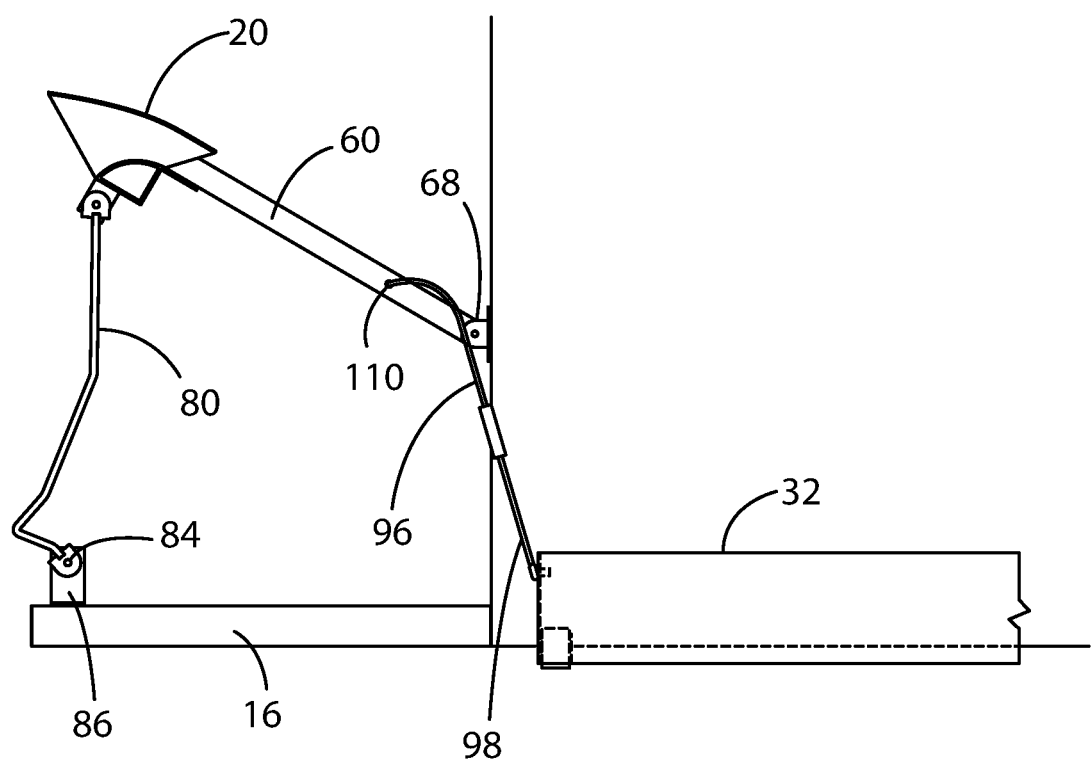
FIG. 7 is a partial, schematic top view of the drag reduction system of FIG. 1 illustrating the rear door of the vehicle 180° open and the drag reduction system continuing to move with the rear door.

The drag reduction system 10 includes an actuator or control mechanism extending between the rear door 16 and at least one deflector 18, 20. The actuator operative to move the nozzle when the door is opened. The act of opening the door moves the nozzle between the first, operative position and the second inoperative position with no additional action. One example of an actuator suitable for use with the drag reduction system 10 is a control arm or rigid link 80 connecting the first rear door 16 to the first side deflector 18 and a second control arm or link 80 connecting the second rear door to the second side deflector 20. As illustrated, each rear door 16 uses the same linkage and accordingly the linkage relating to the second side deflector 20 is referred to understanding that the same description would apply to the first side deflector 18. As illustrated, the control arm or link 80 is pivotally connected on a first end 82, through pivot pin 84 and bracket 86 attached to the rear door 16. The control arm or link 80 is further pivotally connected on a second end 88 to the second side deflector 20, through pivot pin 90 and bracket 92. The control arm or link 80 functions as a drive or actuation member whereby opening the door 16 results in movement of the second side deflector 20. As illustrated in the drawings, repositioning or moving the door 16 from the closed to open position also repositions and moves the side deflector 20 from the first, engaged or operative position and the second, disengaged position wherein the side deflector 20 is placed next to the side 26 of the semi-trailer 12. FIGS. 5-8 Illustrate the positions or locations of the side deflector 20 based upon the position of the door 16. For example, in FIG. 5 when the operator unlatches the door 16 and opens it outward, the control arm or link 80 swings the second side deflector 20 outward about the pivot axis defined by the pivot pin 66. FIG. 7 illustrates the rear door 16 opened 180° and the corresponding position of the second side deflector 20. Finally, when the rear door 16 is opened 270°, that is placed adjacent the side 26 of the semi-trailer 12 the second side deflector 20 is also positioned adjacent the side 26 of the semi-trailer 12. The side deflector 20 moves with or is actuated by movement of the rear door 16. Such a system does not require independent movement of the side deflector 20 or independent action of the operator to first move the side deflector 20 to a non-operative or disengaged position prior to opening the rear door 16.

In the disclosed example, a second actuator or control mechanism is connected to the top deflector 32 and operative to raise the top deflector 32 when one of the rear doors 16 is opened. FIGS. 5-10 illustrate one example of a second actuator suitable for use with the drag reduction system 10 is a control or lift arm or rigid link 96 connected on a first end 98 to the top deflector 32 and at a second end 110 to the support arm 60. Movement of the support arm 60 operates to move the top deflector 32 from the first, engaged position to the second, disengaged position. As illustrated, the control or lift arm 96 has a threaded portion 100 threadably engaging a turnbuckle 102. An eyebolt 104 threadably engages the opposite portion of the turnbuckle 102. A shaft 106 extends outwardly from the top deflector 32. The eye portion of the eyebolt 104 is sandwiched between two washers 108 with the washers 108 and eyebolt 104 on the shaft 106. This arrangement allows the eyebolt 104 and correspondingly the control or lift arm 96 to pivot or rotate slightly on an axis transverse the longitudinal axis of the shaft 106.

The second end 110 of the control or lift arm 96 is pivotally attached to the support arm 60. As illustrated in the drawings, when the support arm 60 pivots or swings from the first to the second position, the control or lift arm 96 moves longitudinally toward the front of the semi-trailer 12 pulling on or drawing the top deflector 32 forward toward the front of the semi-trailer 12 causing the top deflector 32 to pivot about the pivot pin 74 and moving the top deflector 32 upward and away from the rear doors 16 to provide clearance for opening the rear doors 16.

As illustrated, the drag reduction system 10 includes an actuation system whereby a vehicle operator need only open the rear doors 16 to move the side and top deflectors 18, 20, 30 away from rear doors 16. Further, the actuation system operates to secure the side and top deflectors 18, 20, 30 in position when the rear doors 16 are closed.

In an alternative embodiment, the control arm or link 80 is replaced with cables extending from the door 16 to the side deflectors 18. The cable operates to hold the side deflector 18 in position; however, when opening, the door 16 engages the side deflector 18 and pushes it into position. The cable limits the outward swing of the side deflector 18. The side deflector 18 may swing freely until sandwiched between the door 16 and side 26 of the semi-trailer 12.

Additional embodiments may include spring members or retraction devices which operate to hold the first, second and top deflectors 18, 20, 30 in the first, engaged position wherein the control arms or links operate to act against the spring members or retraction devices and hold the first, second and top deflectors 18, 20, 30 in the second, disengaged position.

Figure 11:
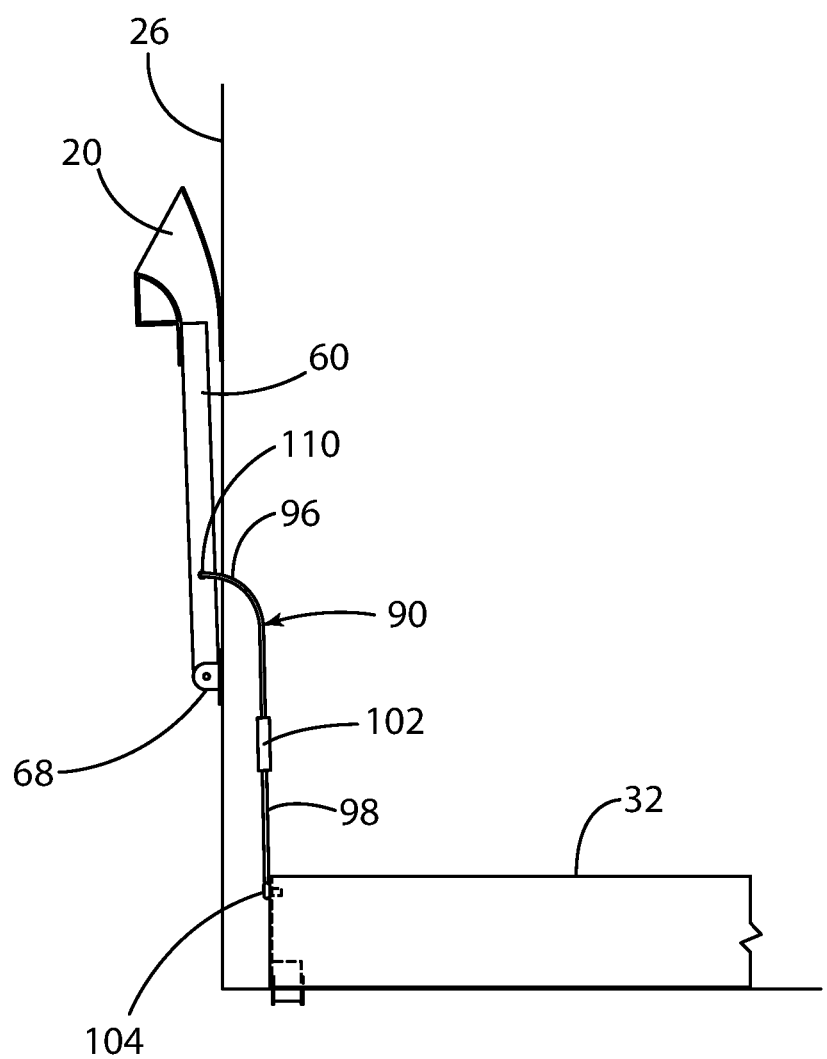
FIG. 11 is a is a partial, schematic top view of an additional embodiment of a drag reduction system of FIG. 1 for use with a semi-trailer having a roll up rear door and the drag reduction system positioned such that it is clear of the rear door opening.

FIG 11 discloses an additional embodiment of the drag reduction system 10 for use with a semi-trailer 12 having a roll up rear door. The deflector 20 is pivotally mounted through support arm 60 and pivot bracket 68 to the side 26 of the trailer 12. A control arm 96 connected between the support arm 60 of the deflector 20 and the top deflector 32 operates to move the top deflector 32 into a raised, inoperative position when the deflector 20 is placed in the second, inoperative position adjacent the side of the semi-trailer. Since movement of the roll up door does not translate into movement of the deflector 20, an actuator may be used to rotate or move the deflector 20 between the first and second positions and correspondingly through the control arm 96 moves the top deflector 32 from the first operative position to the second inoperative position wherein the top deflector 32 is clear of the door opening. Further, an operator may also swing or rotate the deflector 18, 20 into the second position prior to opening the roll up door.

The rear vehicle/trailer drag reduction system set forth above is deployed and retracted by a driver opening and closing rear door(s) with no loading dock structure interference. Deflector support arm or side mount bars mount on side of trailer with a pivot mechanism at a length to allow the deflector or nozzle to automatically open 180 degrees and clear the trailer door in a full open locked position.

The deflector support arm or side mount bars also include a mounting design and location for the top deflector or nozzle retraction/deployment mechanism. The top deflector mounts to top of vehicle/trailer with two or more hinged or rotational fixed mounts.

As disclosed above opening the rear doors results in retraction of side deflectors or nozzles. In addition, opening the rear door causes retraction of the top deflector or nozzle. The mechanical opening mechanism disclosed as a control arm or link in the exemplary embodiment may be hinged, curved, or shaped to clear the trailer door when the trailer door is fully opened.

For vehicles/trailers with split or rear opening side to side doors a complete permanently mounted and operational drag reduction system that fully engages and disengages with opening and closing of trailer doors with no further driver interaction. The drag reduction system operates when vehicle/trailer is in operation and no driver interaction to engage or retract system fuel savings.

Once installed driver opens rear door(s) as part of normal operation. The drag reduction system opens side vertical deflectors/nozzles following path of opening doors without free swinging deflectors/nozzles or having to release latches or securing systems. Deflectors/nozzles at full open are clear of open doors adjacent to side of trailer allowing the driver to latch/secure door as part of normal operation.

The drag reduction system holds the side deflector/nozzle assembly so it does not swing freely when door is opening. The mechanical assembly, in the disclosed embodiment a control arm or link provides deflector/nozzle stability and secures the side deflectors/nozzles while in operation and while trailer doors are opened and closed. The drag reduction system reduces the need for any deflector nozzle brackets, additional mounting and latching/unlatching equipment, or systems to engage and disengage deflectors/nozzles on split rear door vehicles/trailers. The mechanical assembly including the control arm or link attached to the rear doors holds the deflector/nozzle in place as it rotates on side pivot mounting bars with no additional force or operation from driver.

The drag reduction system also provides a mechanism for raising the top deflector/nozzle and moving it up and out of way when opening rear doors. When the rear doors are closed, the top deflector/nozzle is repositioned into the operation position.

As disclosed above, the top deflector/nozzle has two (or more) permanent, bolted, hinged, or swivel mount devices to allow the deflector/nozzle to pivot upward and back when rears doors are opened. The top deflector/nozzle includes a control or lift arm connected to the support arm of the side deflector/nozzle on one end and to the top deflector/nozzle on the other. As the rear doors open and move the support arm, movement of the support arm lists the top deflector/nozzle. The control or lift arm also provides stability to top deflector/nozzle while in operation.

As disclosed the exemplary embodiment include the gap seal which may be an angled, curved or non-curved welded aluminum bar becoming part of the deflector nozzle spine. It can be extruded as part of the deflector nozzle spine, or molded depending on materials and manufacturing process. The gap seal closes the airflow gap on vertical and horizontal (top) deflector nozzles created by vehicle/trailer hinges at far end of trailer. The gap seal provides for an aerodynamic seal of airflow and greater fuel efficiencies with additional stability to deflector nozzles. The drag reduction system does not require permanent securing of vertical side deflectors/nozzles or locking type latching mechanisms at the far end of the trailer which cause additional driver interaction to release or engage and can hinder/interfere with trailer doors fully opened.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drag reduction system mounted adjacent a rear end of a trailer to redirect airflow into a low-pressure zone behind the trailer, the trailer having first and second sides, a top, and first and second outwardly opening rear doors, said system comprising:
- first and second side deflectors, said first side deflector located adjacent a first corner formed at a junction of said first door and said first side and said second side deflector located adjacent a second corner formed at a junction of said second door and said second side;
- a first support arm connected on a first end to said first deflector and pivotally connected on a second end to said first side, and a second support arm connected on a first end to said second deflector and pivotally connected on a second end to said second side; and
- a first actuator connected to said first side deflector and said first door, said first actuator operative to move said first side deflector upon moving said first door and a second actuator connected to said second side deflector and said second door, said second actuator operative to move said second side deflector upon moving said second door;
- a top deflector, said top deflector located adjacent a top corner formed at a junction of said top and said first door and said second door, said top deflector pivotally connected to said top of the trailer; and
- a rigid control arm extending between said top deflector and one of said first and second side deflectors.

2. The system of claim 1 wherein said first actuator includes a first actuator rigid link, said first actuator rigid link extending between said first deflector and said first door and pivotally connected to both said first deflector and said first door; and
said second actuator includes a second actuator rigid link, said second actuator rigid link extending between said second deflector and said second door and pivotally connected to both said second deflector and said second door.

3. The system of claim 2 wherein said first actuator rigid link includes an angled portion and said second actuator rigid link includes an angled portion.

4. The system of claim 1 wherein said rigid control arm includes a link having an L-shape, said link having a loop on one end, said loop connected to said top deflector; and
an end opposite of said loop connected to one of said first support arm and second support arm.

5. The system of claim 1 wherein each of said first and second deflectors include a nozzle for distributing airflow, said nozzle including two longitudinally extending spaced apart plate members defining an airflow passageway.

6. The system of claim 5 including a seal member, said seal member connected to said nozzle.

7. The system of claim 2 wherein said first actuator rigid link controls movement of said first deflector based on movement of said first door; and
said second actuator rigid link controls movement of said second deflector based on movement of said second door.

8. A drag reduction system for a vehicle comprising:
a top deflector movably connected to a top of said vehicle for movement between a first, operative position and a second, inoperative position;
an actuator connected to said top deflector and controlling movement of said top deflector between said first, operative position and said second, inoperative position; and
said actuator indirectly connected to a vehicle door wherein movement of said vehicle door correspondingly, through said actuator, moves said top deflector between said first, operative position and said second, inoperative position.

9. The system of claim 8 wherein said actuator includes a link connected to said top deflector and to a support arm connected to said vehicle.

10. The system of claim 9 wherein said actuator includes a rigid member having first and second ends, said first end pivotally connected to a side deflector connected to said support arm and said second end pivotally connected to said vehicle door.

11. The system of claim 9 wherein said actuator includes said link having a loop on one end; and
a shaft extending from said top deflector and passing through said loop.

12. A drag reduction system mounted adjacent a rear end of a trailer to redirect airflow behind the trailer, the trailer having first and second sides, a top, and first and second outwardly opening rear doors, said system comprising:
- a first side deflector, said first side deflector located adjacent a first corner formed at a junction of said first door and said first side, said first side deflector extending substantially parallel with said first side, said first side deflector pivotally connected to said first side;
- a second side deflector, said second side deflector located adjacent a second corner formed a junction of said second door and said second side, said second side deflector extending substantially parallel with said second side, said second side deflector pivotally connected to said second side;
- a first control arm linking said first side deflector to said first door and a second control arm linking said second side deflector to said second door;
- a top deflector, said top deflector located adjacent a top corner formed a junction of said first door and said second door and said top, said top deflector extending substantially parallel with said top, said top deflector pivotally connected to said top; and
- a rigid member linking said top deflector to one of said first side deflector and second side deflector.

13. The system of claim 12 wherein said first control arm includes a first control arm rigid link that controls movement of said first side deflector based on movement of said first door; and
said second control arm includes a second control arm rigid link that controls movement of said second side deflector based on movement of said second door.

14. The system of claim 13 including a first support arm connected on a first end to said first deflector and pivotally connected on a second end to said first side; and
a second support arm connected on a first end to said second deflector and pivotally connected on a second end to said second side.

15. The system of claim 14 wherein said rigid member includes an L-shaped link, said L-shaped link having a loop on one end, said loop connected to said top deflector; and
an end opposite of said loop connected to one of said first support arm and said second support arm.

16. The system of claim 15 wherein each of said first and second side deflectors includes a nozzle for distributing airflow, said nozzle including two longitudinally extending spaced apart plate members defining an airflow passageway; and
a seal member, said seal member connected to said nozzle.

17. A drag reduction system for a vehicle comprising:
a deflector;

a support arm connected to said deflector;

a pivot assembly pivotally attaching said support arm to the vehicle whereby the deflector moves between a first, operative position and a second, inoperative position; and a rigid link, including an angled portion, extending between and pivotally connected at a first end to said deflector and pivotally connected at a second end to a vehicle door, said rigid link controlling movement of said deflector between said first, operative position and said second inoperative position based on movement of said vehicle door, wherein movement of said vehicle door acts through said rigid link to move said deflector between said first operative position and said second, inoperative position.

18. The system of claim 17 including a top deflector, said top deflector pivotally connected to a top of the vehicle; and a rigid control arm extending between said top deflector and said deflector.

* * * * *